United States Patent [19]

Kirschey

[11] Patent Number: 5,545,090
[45] Date of Patent: Aug. 13, 1996

[54] SHAFT COUPLING WITH RING-SHAPED PARALLEL MEMBRANES

[75] Inventor: Gerhard Kirschey, Wuppertal, Germany

[73] Assignee: Centa-Antriebe Kirschey GmbH, Haan, Germany

[21] Appl. No.: 196,969

[22] Filed: Feb. 15, 1994

[30] Foreign Application Priority Data

Feb. 16, 1993 [DE] Germany ............... 43 04 611.8

[51] Int. Cl.[6] .............. F16D 3/02; F16D 3/06; F16D 3/74

[52] U.S. Cl. .............. 464/96; 464/99

[58] Field of Search ............ 464/96, 99, 147, 464/185

[56] References Cited

U.S. PATENT DOCUMENTS

| | | | |
|---|---|---|---|
| 1,455,242 | 5/1923 | Corgiat, Jr. et al. | 464/99 |
| 2,871,683 | 2/1959 | Hallewell | 464/96 |
| 2,883,839 | 4/1959 | Troeger et al. | |
| 2,997,863 | 8/1961 | Stone . | |
| 3,988,907 | 11/1976 | Bohm et al. | 464/96 X |
| 4,096,711 | 6/1978 | Carlson et al. | 464/99 |
| 4,265,099 | 5/1981 | Johnson et al. | 464/99 |
| 5,364,309 | 11/1994 | Heidrich et al. | 464/99 |

FOREIGN PATENT DOCUMENTS

| | | | |
|---|---|---|---|
| 1426477 | 12/1965 | France . | |
| 2550289 | 2/1985 | France . | |
| 3028160 | 2/1982 | Germany | 464/99 |
| 8606870 U | 4/1987 | Germany . | |
| 8434950 U | 1/1990 | Germany . | |
| 2104191 | 3/1983 | United Kingdom | 464/185 |

OTHER PUBLICATIONS

K. Ehrlenspiel; "Die Wellenkupplung ALS Systemelement" DE–Buch. VDI–Berichte 299, 1977, S. 161–169.

N. Rohbeck; "Dipel–Membrankupplung–Neuwntwicklung MIT Verbesserten Eigenschaften" DE–Z, Antriebstechnik 30, 1991, Nr. 2, S. 55–60.

Primary Examiner—Daniel P. Stodola
Assistant Examiner—Emmanuel M. Marcelo
Attorney, Agent, or Firm—Herbert Dubno; Andrew Wilford

[57] ABSTRACT

The shaft coupling has a pair of parallel sheetmetal membranes which are fixed together at their outer periphery and at their inner peripheries and are connected by respective sets of connectors to a hub and a formation which can be connected to another shaft. The connectors can include clamping bushes which have their heads or shoulders between the membrane and are engaged by clamping screws extending into the bushes from the exterior so that between the membranes, only the thickness of a shoulder is provided along the inner periphery. A highly compact shaft coupling can be obtained in terms of axial dimensions.

15 Claims, 3 Drawing Sheets

SHAFT COUPLING WITH RING-SHAPED PARALLEL MEMBRANES

FIELD OF THE INVENTION

The present invention relates to a shaft coupling and, more particularly, a coupling for interconnecting two shafts to transmit rotation therebetween while compensating for radial, axial and angular displacements of the interconnected shafts. Specifically, the invention relates to a shaft coupling of the type which has an elastically bendable compensating element in the form of two disk-shaped and/or ring-shaped membranes connected in series and forming a tandem-membrane assembly, with the membranes having their outer peripheries fixedly interconnected and lying generally parallel to one another while their inner peripheries are connected with the respective machine elements capable of undergoing relative displacement.

BACKGROUND OF THE INVENTION

A shaft coupling of the tandem membrane type is utilized in the form of a fully metallic shaft coupling, the membranes consisting of sheet metal, while the inner and outer rings are connected by the membranes which compensate for alignment errors of the shaft axes and relative angular offsets thereof. A schematic overview of this type of shaft coupling and the characteristics of such couplings are given by K. Ehrenspiel and G. Henkel in VDI Berichte (VDI Reports), No. 299, 1977, page 161.

The present invention is concerned primarily with membrane couplings of the type described in the literature (Op. Cit., page 162) and referred to as double couplings with outwardly disposed intermediate membranes. In such systems, two machine elements, for example shafts, are coupled with compensation for relative axial, angular and radial displacement with the aid of an intermediate member coupling the individual axially spaced membranes in series or in succession.

A series connection of the membranes increases the permissible angular and axial offset in proportion to the number of membranes. This construction also has the advantage that the connection region of the so-called intermediate member is substantially free from forces since this region is generally free to move in the radial direction.

A problem with earlier shaft couplings of the type in which two or more individual membranes are coupled together by intermediate members in accordance with prior art principles, is that the overall length of the shaft couplings may be greater than desired. Problems with assembly, connection and disconnection of such shaft couplings have also arisen.

OBJECTS OF THE INVENTION

It is, therefore, the principal object of the present invention to provide an improved tandem-membrane coupling which, at least by comparison with earlier shaft couplings, can be of reduced axial length but nevertheless is capable of allowing the axial, angular and rotary displacements required of effective shaft couplings.

Another object of the invention is to provide an improved shaft coupling which allows parts to be exchanged or replaced with relative ease and, in particular, reduces the danger of uncontrolled flying parts upon failure of a membrane, especially in the case of a tubular structure serves to connect the tandem membrane to one of the shafts.

Still another object of the invention is to provide an improved shaft coupling which allows the replacement of parts and the mounting and dismounting of the coupling without requiring axial shifting of the shafts or the machine parts coupled by the shaft coupling.

A further object of this invention is to provide an improved shaft coupling, especially of the tandem-membrane type which is free from the drawbacks of prior art shaft couplings, is easier to assemble and install, and provides improved safety.

SUMMARY OF THE INVENTION

These objects are attained, in accordance with the present invention, by providing a shaft coupling of the tandem-membrane type in which the inner periphery of one of the membranes is connected to its shaft via an axially clamping clamp bush arrangement in which an annular formation, like a hub, flange or the like to which the tandem-membrane assembly is to be connected is disposed on one side of the membrane while clamping bushes having sleeve portions and annular shoulders formed on these sleeve portions are provided so that the sleeve portions pass axially through the bores of the membrane and the shoulders lie against the side of the membrane turned toward the other membrane. The clamping screws can pass from the side of the formation through the sleeve portion. According to the invention, therefore, a shaft connector can comprise:

a first member connectable to one shaft and a second member connectable to another shaft capable of rotation with relative movement between the shafts;

at least one tandem-membrane assembly forming an elastically bendable connection between the members, the tandem-membrane assembly comprising:

two substantially parallel annular sheet-metal membranes lying generally transverse to a longitudinal axis of the shaft coupling, and means for fixedly connecting outer peripheries of the membranes together, the membranes having respective inner peripheries; and respective connecting means for operatively connecting each of the inner peripheries to a respective one of the members, at least one of the connecting means including:

an annular clamping formation on one side of one of the membranes connected to the one of the members and provided with bores axially aligned with holes in the one of the membranes along the inner periphery thereof, respective clamping screws traversing the bores, and respective clamping bushes threadedly engaged by the screws, each of the clamping bushes having a sleeve portion extending through the respective hole into a respective bore of the clamping formation, and a respective shoulder formed on an end of the respective sleeve portion turned toward the other of the membranes and engaging against a surface of the one of the membranes juxtaposed with the other membrane for clamping the one of the membranes between the shoulder and the formation.

Naturally it is preferred that the inner peripheries of both membranes be connected by clamping systems of this type to the respective formations. The connection of the membranes or at least one of the membranes of a tandem-membrane assembly has the significant advantage that, along the surface of each membrane turned toward the other membrane only the flat and thus axially very short shoulder of the bush will project. The two membranes of a tandem-membrane assembly can thus be placed especially close to one another and the axial length of the assembly can be minimal for a given axial spread of the membranes and hence relative axial displaceability of the shaft connection.

From the fact that the shoulders of the bushes lie along the inner surfaces of the membranes turned toward one another, it is clear that the clamping screws must pass from the outer side of the tandem-membrane assembly axially inwardly which permits the tandem-membrane assembly to be readily connected to the machine parts and facilitates the replacement of the tandem-membrane assembly or the parts thereof should there be a failure.

It has been found to be advantageous to provide each clamping bush with an internal screw thread for threaded engagement with the clamping screw and to form the periphery of the clamping bush with a clamping sleeve receiver within which the clamping bush is receivable without play. The head of the clamping screw can be braced at least indirectly against this sleeve so that a clamping free from play is provided between the shoulders of the bushes and the clamping sleeve in which the bush is engaged or the formation when that forms the clamping sleeve.

The clamping sleeve receptacle or receiver can be provided directly in the coupling part to which the tandem-membrane assembly is to be connected, e.g. a hub flange providing the formation, or in a spacer constituting the formation and provided between the tandem-membrane assembly and other parts of the coupling which, in turn, can be connected to one of the shafts. The formation can be an annular disk.

The radially inner clamping screws of the two individual membranes of a tandem-membrane assembly can be distributed along different pitch circles so that for the fastening means for each of the membranes there is no overlap in the radial direction. With such an arrangement, the fasteners can be located between one another of the two membranes and an especially small distance can be provided between the membranes. In this case, in the space between the individual membranes only the shoulders of the clamping bushes of the membrane attaching systems are provided and these are so offset that contact between fasteners of the two membranes cannot occur. The membranes can be so arranged, further, that with maximum deflection of the membranes, the shoulders of one set of clamping bushes do not engage the other membrane. With a shaft coupling in the configuration of a Cardan or universal joint shaft, utilizing a tubular connecting piece between two coupling arrangements, it has been found to be advantageous to provide the membranes which are connected to the tubular connecting piece so that they are radially offset outwardly from the connectors joining the inner periphery of the other membrane to the members which themselves are connected to the shafts. This results in a radial offset of the two sets of connectors for the or each tandem-membrane unit.

A radial offset is not, however, essential to allow the membranes of a tandem-membrane assembly maximum play while ensuring a closest possible juxtaposition of the individual membrane. An alternative to the radial offset is to provide both sets of connectors at the same radial spacing from the axis and to peripherally offset the connectors, i.e. to angularly offset the connectors of one set from the connectors of the other set. In this arrangement, the closest possible spacing is achieved between the membranes since the shoulders of the clamping bushes of one set of connectors can engage in gaps between clamping bushes of the other set and vice versa. A close spacing of the membranes is here possible without having opposing connectors interfering with one another.

When the membrane coupling is utilized to couple two shafts via, for examples, respective hubs, directly together, there is the danger that a rupture of a membrane will result in a failure of the coupling. Portions of the coupling which are cast off are generally only a problem when both membranes break simultaneously and that seldom occurs.

However, when a central connecting tube is provided between two tandem-membrane units or when between two parts of the coupling an an intermediate member is provided, there is a danger that the breakage of even one membrane that this intermediate part will be flung outwardly and cause problems.

Such problems are prevented in accordance with the invention by extending at least some of the clamping screws through the respective bushes so that they protrude past the shoulders thereof and can engage in pockets formed in the other set of connectors, i.e. the connectors of the other membrane. These pockets can trap the screws axially and radially while allowing both axial and radial play sufficient to enable the shaft coupling to compensate for the relative disalignment of the axes of the shafts.

This arrangement has been found to be especially advantageous when the two members of the or each tandem-membrane assembly have different radial extents.

When identical membranes are used so that all of the connectors or fasteners lie along a common circle, an alternative arrangement is provided whereby the pockets are also disposed along this circle but between the clamping bushes of the respective sets. This arrangement has the advantage that even with a rupture of a membrane, the engagement of the screw extensions in the pockets can maintain the coupling of the parts in an emergency.

BRIEF DESCRIPTION OF THE DRAWING

The above and other objects, features, and advantages will become more readily apparent from the following description, reference being made to the accompanying drawing in which:

FIG. 1a is a detail of the inner connection of the two membranes to the rubber ring assembly on the one hand and a hub on the other;

FIG. 2a is a detail view in axial section through a detail of FIG. 2;

FIG. 2b is a view like FIG. 2 of another shaft coupling according to the invention;

FIG. 2c is a partly sectional view taken in the direction of arrow IIc of FIG. 2b.

SPECIFIC DESCRIPTION

Figure 1:
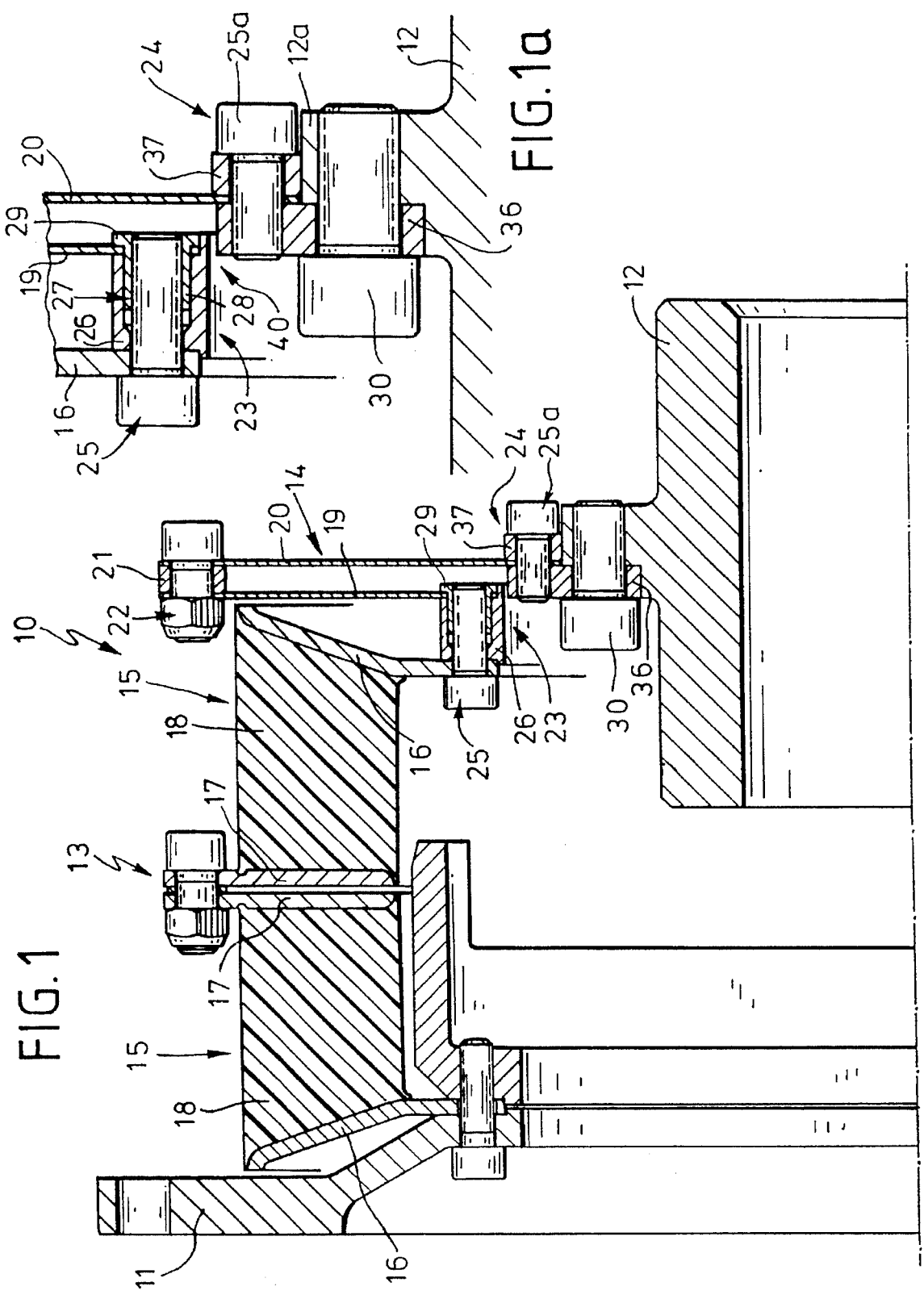
FIG. 1 is a cross sectional view of a tandem-membrane assembly in combination with an elastic rubber ring assembly in a shaft coupling according to the invention.

The shaft coupling shown at 10 in FIG. 1 serves to compensate radial, axial and angular offsets of the two shafts connected by the coupling while transmitting rotation between them. One of these shafts is provided with a drive flange 11 (first member) while the other is at least indirectly angularly fixed to the hub 12 (second member). The shaft coupling in the embodiment of FIG. 1 has a highly angularly elastic rubber ring coupling 13 and an angularly rigid membrane coupling 14 connected in series with the rubber ring and serving to compensate radial, axial and angular offsets or misalignments between the axes of the two shafts during rotation thereof.

The highly rotationally elastic rubber ring coupling 13 is comprised of two axially aligned elements 15 of the type marketed by the Centa-Antriebe Kirschey GmbH of Haan/Rhineland, Germany under the designation CENTAX elements. Each of these CENTAX elements is comprised of a frustoconical flange 16 and a blank flange 17 of steel, interconnected by a highly elastic rubber ring 18 vulcanized onto the two flanges.

The membrane coupling 14 is comprised of two membranes 19 and 20 in a tandem-membrane assembly. In an unloaded state of the coupling, these membranes 19 and 20 are spaced apart in the axial direction, lie parallel to one another and extend perpendicular to the axis of the shaft coupling. The two membranes are annular disks of the same outside diameter, the outer peripheries of the two disks being interconnected by angularly equispaced screw connectors 22 which have spacer sleeves 21 surrounding the shafts of the screws and spacing apart the two membranes 19 and 20.

One of the membranes 19 is connected to the proximal flange 16 of the elastic coupling 13 by a set of connectors 23 while the other membrane 20 and is connected to the hub 12 by a set of connectors 24. The two sets of connectors lie along pitch circles of different diameters and the set of connectors 23 lie outwardly of the set of connectors 24. The term pitch circle is used herein to refer to the circles along which the centers of the respective screws and bushes forming the connectors lie. The "pitch" is the center to center spacing of the connectors along the circumference of the respective pitch circle.

Each of the sets of connectors 23 and 24 includes a plurality of angularly equispaced axially extending clamping screws 25 or 25a.

The connectors of the set 23 with which the first membrane 19, which has its inner periphery set radially outwardly of the inner periphery of the membrane 20, is connected to the proximal flange 16 of the rubber coupling 13, comprises the respective screw 25 passing through an annular disk 26 which constitutes an annular formation in which the respective clamping bushes 27 are received, clamping bushes 27 being internally threaded to allow the screws 25 to be threaded into them.

The ring 26, constituting the formation to which the inner periphery of the one membrane 19 is anchored, thus is provided with a number of stepped bores corresponding to the number of clamping screws 25 and whose narrow portions are turned away from the second membrane 20 and serve to pass the threaded shank of the respective screw 25.

The wider section of each stepped bore is turned toward the second membrane 20 serves to accommodate the respective clamping bush 27 which has a sleeve portion 28 and a flat annular flange or shoulder 29 of low height which engages the face of the membrane 19 juxtaposed with membrane 20. The other side of membrane 19 juxtaposed with membrane 20. The other side of membrane 19 abuts the ring 26. The outer surface of the sleeve portion 28 forms with the inner surface of the stepped bore within the spacer ring 26 a cylindrical fit free from play.

As is especially apparent from FIG. 1a, the membrane 19 in the region of its inner periphery is connected to the flange 16 of the elastic coupling 13 by the axial clamping elements constituted by the screw and bush combinations. Each screw is braced against the flange 16 and draws that flange against the spacer ring 26, thereby drawing the shoulder 29 against the inner side of the membrane 19 to clamp the latter against the spacer ring 26.

In the embodiment of FIG. 1 and 1a, the set 24 of connectors deviates in construction from the set 23 previously described in that here the heads of the screws 25a bear directly against spacer bushings 37 and are threaded into a fastening ring 36. The hub 12 is formed with a hub flange 12a into which screws 30 are threaded to hold the fastening ring 36 in place. The ring 36 is provided with the threaded bores into which the screws 25a are threaded. The membrane 20, which is clamped between the ring 36 and the bushings 37 by the screws 25a passing through holes along the inner periphery of membrane 20 is thus connected with the hub 12 with a friction and clamping junction.

As is also apparent from FIGS. 1 and 1a, the two membranes 19 and 20, apart from having their outer peripheries connected together, have inner peripheries which are radially offset, i.e. the membrane 19 is significantly shorter than the membrane 20. The radial offset of the inner peripheries of the membranes 19 and 20 ensures that the connectors 23 and 24 of the membranes 19 and 20 will also be radially offset and will not overlap in the radial direction. Between the membranes 19 and 20 at the regions of their inner peripheries, there is only interposed the shoulders 29 of the bushes 27 and which are of relatively small height. While allowing the requisite play between the membranes 19 add 20, they can, as a consequence, be disposed quite close together.

Figure 2:
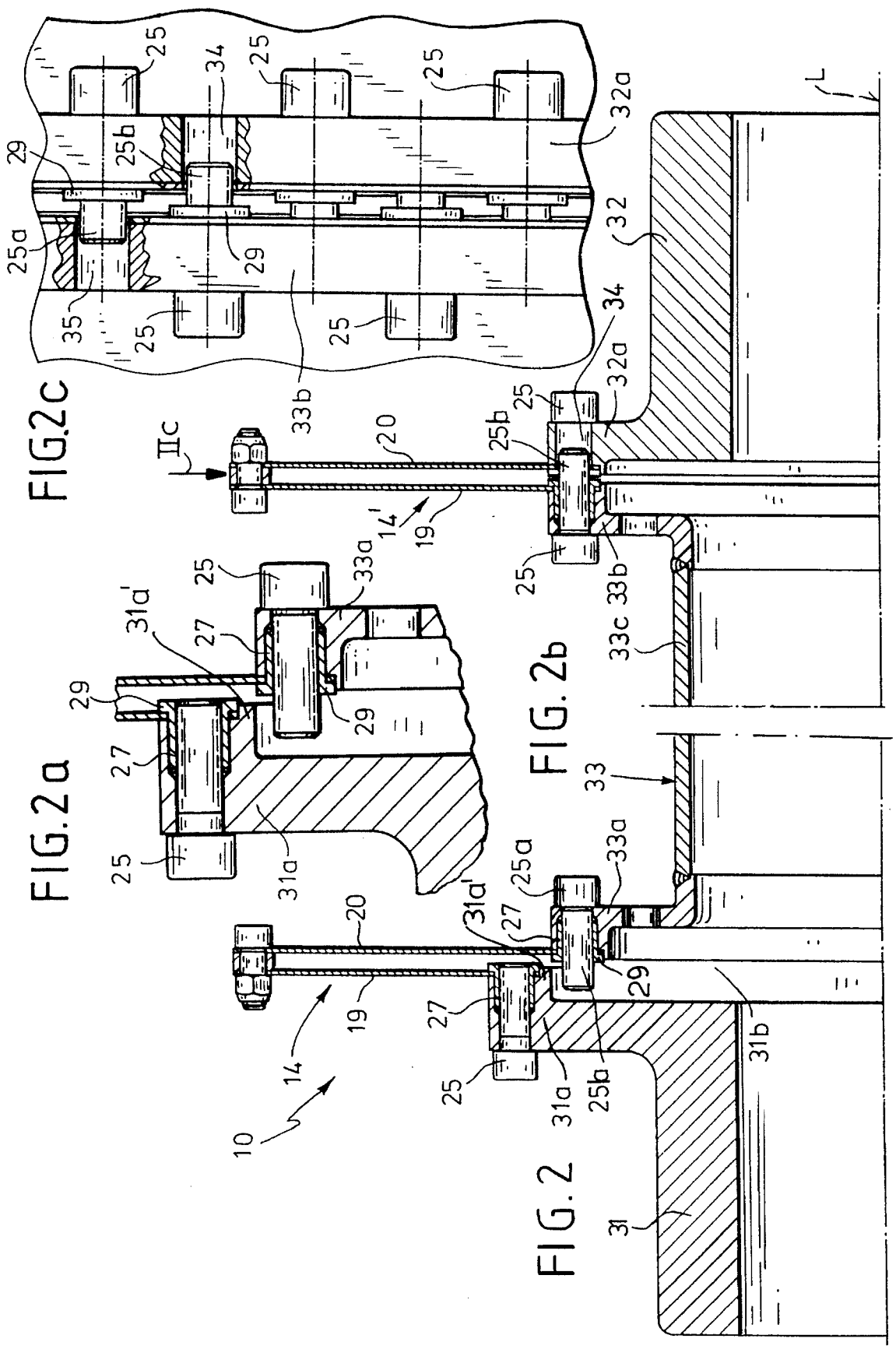
FIG. 2 is an axial section through another shaft coupling according to the invention.

FIG. 2 shows a universal shaft arrangement connecting a hub 31 and a shaft 33 each angularly entrained with or keyed to a respective shaft, not shown, the shaft coupling including here a membrane couplings 14.

The membrane coupling 14 of FIGS. 2 and 2a has a membrane 19 with its inner periphery set radially outward of the inner periphery of the membrane 20 and connected to a flange 31a of hub 31. The membrane 20, in turn, is connected to a flange 33a welded to the tube 33c. This membrane coupling 14 is similar to the membrane coupling described in connection with FIG. 1. The membrane 19 is connected to the flange 31a by clamping screws 25 threadedly engaging the bushes 27. The clamping screws 25a engage in bushes 27 to secure the membrane 20 to the flange 33a. The clamping bush receptacles are stepped bores in the hub flange 31a and the pipe flange 33a and are formed directly therein. The heads of the screws 25 and 25a bear directly against the outer sides of the flanges 31a and 33a.

The radial offset between the connectors of the membranes 19 and 20 corresponds to the radial offset of the outer peripheries of the flanges 31a and 33a with a clearance preventing them from coming into contact during operation of the shaft coupling 14.

The second membrane coupling 14' of FIGS. 2b and 2c comprises two membranes 19 and 20 of the same radial dimensions so that the pitch circles of the connectors which connect the membrane 19 to the pipe flange 33b of the tube shaft 33c and the membrane 20 with the hub flange 32a are of the same radial distance from the axis L of the coupling 14'.

As can be seen from FIG. 2c, however, the connectors of the membranes 19 and 20 are peripherally offset from one another so that one connector lies in the gap between the connectors of the other set. Here again only the minimum height of the shoulder 29 of the bushes 27 is interposed between the membranes 19 and 20 at their inner peripheries.

As shown in FIG. 2 and 2a, at least some of the screws 25a can be extended as shown at 25b beyond the respective shoulders 29 of their bushes 27 so as to axially overlap an overhanging rim 31a' of the flange 31a. The screws 25a which are thus extended need not be all of the screws of the set and, for example, three equispaced screws will suffice. The overhanging portion 31a' forms a bell-shaped portion of the flange 31a which provides a stop should rupture of one of the membranes 19, 20 free the left-hand end of the tubular intermediate piece 33 to swing outwardly.

In FIGS. 2b and 2c, a different but equally simple system prevents the free swinging of the tubular member 33 should either of the membranes 19 and 20 of the membrane assembly 14' rupture. In this case, the flanges 32a and 33b have essentially the same diameter and where the screws 25 are located opposite gaps between the connectors of the other flange. The screws 25 are extended at 25b to engage in pockets in the form of bores 34, 35 with all around clearance to allow compensation by the shaft connector as described but preventing the outward movement of the piece 33 upon such rupture.

It is important that the lumen cross section of the bores 34 and 35 allow play for the extensions 25b of the screws to avoid limiting the angular or radial offset of the axes of the shafts which are connected by the coupling.

The safety factor is provided in the embodiment of FIG. 1, where the ring 26 surrounds the ring 36 with a radial and axial overlap as represented at 40 in FIG. 1a, thereby preventing the elastomeric coupling 13 from freely swinging upon rupture of one or both of the membranes 19 and 20.

Figure 3:
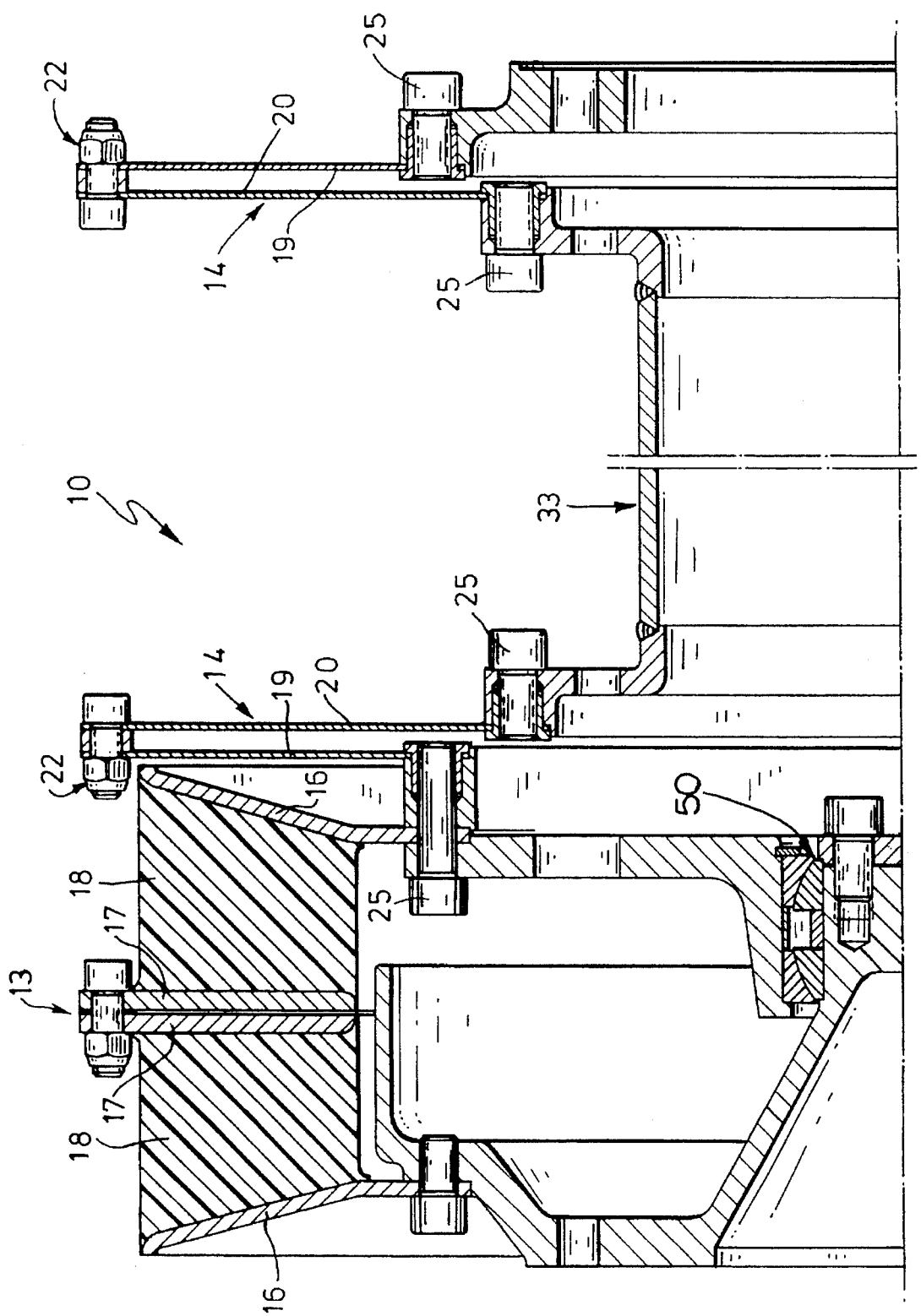
FIG. 3 is an axial cross sectional view of a double-membrane Cardan type shaft generally of the type shown in FIG. 2 but utilizing the highly angularly elastic rubber ring assembly of FIG. 1 or similar thereto.

FIG. 3 shows a further embodiment in which a highly rotationally elastic rubber ring coupling 13 as represented in FIG. 1 forming part of a universal joint shaft arrangement 50 is connected to an intermediate piece 33 via one membrane assembly 14 while another membrane assembly 14 connects that intermediate member 33 to one of the shafts. Since all of the elements of this coupling have been described previously, a repetition of the description is not required, the numerals used being the same as those which have been described. As will be apparent from all of the Figures of the drawing, the coupling system of the invention can be easily mounted or dismounted and even the intermediate piece 33 poses no problems. The parts can be readily interchangeable and replaced. All of the clamping screws 25 extend axially and are readily accessible from the exterior of the spaces between the membranes. The fact that the fit between the outer periphery of the sleeve portion 28 of a clamping bush 27 and the clamping bush receptacle is free from play, whether the receptacle in an annular body like the spacer ring or directly in a flange like, for example, the hub flange 31a, has the important advantage that the clamping bush 27 itself is utilized for torque transfer.

For example, referring to the membrane 19 in FIG. 1a, it can be seen that the spacer ring 26 transfers torque frictionally directly to the left outer side of membrane 19 and in part via the form-fitting connection of the bushing 27 with the hole wall of the membrane 19 and in part by friction against the right-hand side of the membrane by the engagement of the shoulder 29 therewith. The normal force of each clamping screw 25 is converted into two friction forces applied to the opposite sides of the membrane. This cannot be ensured when play is permitted in the system. By eliminating play in accordance with the invention, smaller screws can be used, the number of screws of each set can be reduced or improved, reliability can be obtained with the screws which are used by comparison with systems in which play is permitted.

I claim:

1. A shaft coupling for compensating radial, axial and angular relative movements between a pair of shafts extending generally along an axis, the coupling comprising:

a first member connectable to and rotatable about the axis with one of the shafts and a second member connectable to and rotatable about the axis with the other shaft with relative radial, axial and angular movement between said shafts;

at least one tandem-membrane assembly forming an elastically bendable connection between said members, said tandem-membrane assembly comprising:

two substantially parallel annular membranes lying generally transverse to the axis of the shaft coupling and having respective inner peripheries each formed with an annular array of holes, respective outer peripheries, inner faces directed toward each other and outer faces directed away from each other, and means for fixedly connecting the outer peripheries of said membranes together; and respective connecting means for operatively connecting each of said inner peripheries to a respective one of said members, at least one of said connecting means including:

an annular clamping formation engaging the outer face of one of said membranes and connected to the respective member and provided with bores axially aligned with the holes in said one of said membranes along said inner periphery thereof, respective clamping screws traversing said bores and the respective holes, and respective internally threaded clamping bushes directly threadedly engaged by said screws, each of said clamping bushes having a sleeve portion extending through the respective hole into a respective bore of said clamping formation and formed with an internal screwthread, and a respective shoulder formed on an end of the respective sleeve portion turned toward the other of said membranes and directly engaging against the inner face of said one of said membranes for clamping said one of said membranes between said shoulder and said formation;

respective clamping screws connecting said other of said membranes to the other of said members, the screws of each of said membranes being angularly spaced around respective pitch circles of different radii.

2. The shaft coupling defined in claim 1 wherein each of said clamping bushes has a periphery engaging in a clamping-sleeve receptacle of an element against which a head of the respective screw is braced at least indirectly to form a fit of the clamping bush free from play.

3. The shaft coupling defined in claim 1 wherein said formation is a flange of a hub.

4. The shaft coupling defined in claim 1 wherein said formation is a spacer between said tandem-membrane assembly and another elastic coupling assembly to which the tandem-membrane assembly is connected by the screws traversing said formation.

5. The shaft coupling defined in claim 1 wherein each of said membranes is a thin sheet-metal annular disk.

6. The shaft coupling defined in claim 5 wherein each disk is composed of steel.

7. The shaft coupling defined in claim 1, further comprising an elastomeric ring coupling assembly having a flange forming said formation and connected with said tandem-membrane assembly.

8. The shaft coupling defined in claim 7, further comprising an elastomeric ring coupling assembly having a flange, and a tubular intermediate part having a first flange connected with said flange of said elastomeric ring coupling assembly and a second flange constituting said formation and connected with said tandem-membrane assembly.

9. The shaft coupling defined in claim 1, further comprising another tandem-membrane assembly, and a tubular intermediate part having a first flange connected as the respective formation with the first-mentioned tandem-membrane assembly and a second flange connected as the respective formation with the other tandem-membrane assembly.

10. A shaft coupling for compensating radial, axial and angular relative movements between a pair of shafts extending generally along an axis, the coupling comprising:

a first member connectable to and rotatable about the axis with one of the shafts and a second member connectable to and rotatable about the axis with the other shaft with relative radial, axial and angular movement between the shafts;

at least one tandem-membrane assembly forming an elastically bendable connection between the members, the tandem-membrane assembly comprising:

two substantially parallel annular membranes lying generally transverse to the axis of the shaft coupling and having respective inner peripheries each formed with an annular array of holes, respective outer peripheries, inner faces directed toward each other and outer faces directed away from each other, and means for fixedly connecting the outer peripheries of the membranes together; and respective connecting means for operatively connecting each of the inner peripheries to a respective one of the members, at least one of the connecting means including:

an annular clamping formation engaging the outer face of one of the membranes and connected to the respective member and provided with bores axially aligned with the holes in the one of the membranes along the inner periphery thereof, respective clamping screws traversing the bores and the respective holes, and respective internally threaded clamping bushes directly threadedly engaged by the screws, each of the clamping bushes having a sleeve portion extending through the respective hole into a respective bore of the clamping formation and formed with an internal screwthread, and a respective shoulder formed on an end of the respective sleeve portion turned toward the other of the membranes and directly engaging against the inner face of the one of the membranes for clamping the one of the membranes between the shoulder and the formation;

respective clamping screws connecting the other of the membranes to the other of the members, the screws of each of the membranes being angularly spaced around respective pitch circles of substantially the same diameter with the screws of one pitch circle angularly offset from the screws of the other pitch circle.

11. The shaft coupling defined in claim 10 wherein the clamping screws of the inner peripheries of the membranes of said tandem-membrane assembly lie along different pitch circles and the shoulders of the bushes of the membranes are radially offset from one another and do not radially overlap.

12. The shaft coupling defined in claim 11 wherein a tubular intermediate part is connected to said tandem-membrane assembly and is disposed between two elastic shaft-coupling assemblies, the pitch circle of the membrane of said tandem-membrane assembly connected to said intermediate part lying radially inwardly of the pitch circle of the other membrane.

13. The shaft coupling defined in claim 10 wherein the clamping screws and clamping bushes of the two membranes lie substantially at a common radial distance from an axis of the shaft coupling, the clamping screws and clamping bushes of one of the membranes being angularly offset from the clamping screws and clamping bushes of the other membrane so as to lie between the clamping screws and clamping bushes of the other membrane and so that there is no circumferential overlap of the clamping screws and clamping bushes of the membranes.

14. The shaft coupling defined in claim 10 wherein the clamping screws of at least one of said membranes are extended axially and are axially overlapped by a radially outwardly lying retaining portion of a formation attached to the other membrane.

15. The shaft coupling defined in claim 14, further comprising pockets formed in said formation attached to said other membrane for receiving extensions of the screws of said one of said membranes projecting axially beyond the shoulders of the bushes thereof.

* * * * *